United States Patent [19]
Diensthuber

[11] Patent Number: 5,660,651
[45] Date of Patent: Aug. 26, 1997

[54] PNEUMATIC TIRE INCLUDING SIPES

[75] Inventor: Franz Diensthuber, Schonau, Austria

[73] Assignee: Semperit Reifen AG, Traiskirchen, Austria

[21] Appl. No.: 392,166

[22] Filed: Feb. 22, 1995

[30] Foreign Application Priority Data

Feb. 25, 1994 [AT] Austria ........................ 391/94

[51] Int. Cl.⁶ .................................................. B60C 11/12
[52] U.S. Cl. .................... 152/209 A; 152/DIG. 3
[58] Field of Search .................. 152/209 R, 209 D, 152/DIG. 3, 209 A

[56] References Cited

U.S. PATENT DOCUMENTS

| | | | |
|---|---|---|---|
| 3,405,753 | 10/1968 | Verdier | 152/209 A |
| 4,479,525 | 10/1984 | Graas | 152/209 R |
| 4,598,747 | 7/1986 | Flechtner | 152/DIG. 3 |
| 5,152,852 | 10/1992 | Hisamichi et al. | 152/209 A |
| 5,198,047 | 3/1993 | Graas et al. | 152/209 R |
| 5,301,727 | 4/1994 | Inoue | 152/DIG. 3 |
| 5,361,814 | 11/1994 | Covert et al. | 152/209 A |

FOREIGN PATENT DOCUMENTS

| | | | |
|---|---|---|---|
| 494612 | 10/1975 | Australia | 152/209 D |
| 390916 | 7/1990 | Austria . | |
| 0330644 | 8/1989 | European Pat. Off. | B60C 11/11 |
| 2640913 | 6/1990 | France . | |
| 243470 | 3/1987 | Germany | 152/DIG. 3 |
| 8809532 | 10/1988 | Germany | B60C 11/04 |
| 9008 | 1/1989 | Japan | 152/DIG. 3 |
| 1514473 | 6/1978 | United Kingdom | 152/209 A |

OTHER PUBLICATIONS

Patent Abstracts of Japan, vol. 9, No. 191 (M–402) [1914], dated Aug. 7, 1985, which is an abstract of Japanese Patent Publication No. 60–056605 (Yokohama Rubber Co., Ltd.), Apr. 2, 1985.

*Primary Examiner*—Steven D. Maki
*Attorney, Agent, or Firm*—Greenblum & Bernstein, P.L.C.

[57] ABSTRACT

Pneumatic tire. The invention pertains to a vehicle tire for use in winter driving conditions whose tread pattern includes a circumferentially extending row in each of the shoulder regions, wherein the profile or pattern is asymmetrically shaped and includes, relative to the vehicle, an inner tread portion and an outer tread portion, with the shoulder block row of the inner tread portion being provided with sipes having good opening characteristics, with reference to the circumferential direction of the tire, and the shoulder block row of the outer tread portion is provided with sipes that assure high block rigidity during lateral force loading.

17 Claims, 2 Drawing Sheets

PNEUMATIC TIRE INCLUDING SIPES

CROSS REFERENCE TO RELATED APPLICATIONS

This application claims the priority of Austrian Application No. 391/94, filed Feb. 25, 1994, the disclosure of which is incorporated herein by reference in its entirety. This application is also related to the copending counterpart U.S. application Ser. No. 08/392,078, based on Austrian Application 392/94.

BACKGROUND OF THE INVENTION

1. Field of the Invention

The present invention pertains to a motor vehicle tire, particularly for use in winter driving conditions, including a tread having a pattern, with the tread pattern including pattern structures having several block rows, wherein at least in each shoulder region a row of blocks extends in the circumferential direction and wherein the pattern structures are provided with a plurality of sipes.

2. Discussion of the Background of the Invention and Material Information

Pneumatic vehicle tires having tread pattern of that type are available in differing variations thereof and have performed very well in the last several years during winter driving conditions. The detailed arrangement of the tread pattern, particularly those having lamellar fine cuts or sipes are the subject of a number of patents and patent applications. For example, a pneumatic tire of the previously-described type is set forth in Austrian Patent AT-B 390,916, with the tread pattern of the described tire being comprised of several profile block rows in combination with at least one tread band in the center or middle region of the tread. These pattern structures are each provided with a plurality or multiplicity of lamellar fine cuts or sipes which substantially extend in the lateral direction of the pattern and are shaped as straight-line extending sipes over the major extend of their lengths. Winter or snow tires that are produced according to the noted patent have been very successfully marketed under the designation "SEMPERIT TOP-GRIP SLG" and have very balanced or calibrated winter driving properties.

It is the task or object of this invention to improve a tire of the initially described type with regard to optimizing the transfer of driving forces on snowy or icy surfaces or roads and to further improve the driving properties thereof also on dry as well as wet surfaces.

SUMMARY OF THE INVENTION

This task or object is achieved in accordance with this invention, in that the tread pattern is asymmetrically formed and, relative to the vehicle, includes an inner and an outer tread portion, wherein sipes are provided in the shoulder block row of the inner tread portion which have good opening characteristics in the circumferential direction and wherein sipes are also provided in the shoulder block row of the outer tread portion which assure high block rigidity during lateral force loading.

It was surprisingly determined that the inventive combination of sipes in the inner shoulder block row which, due to the creation of gripping edges, open readily, together with the sipes of the outer shoulder block row, which produce a corresponding stiffening or rigidity effect, achieves particular advantages. Within the scope of this invention it was determined, and confirmed by tire testing, that for good driving behavior, that is for handling, it is of particular importance that in the outer shoulder region of a tire, the pattern stiffness is high during lateral force loading, while it is or primary importance, during the transfer of traction forces, that the tread inner or center region have as many grip edges as possible for the utilization thereof.

In accordance with a preferred embodiment of the invention, the sipes in the inner shoulder block row, when viewed in a top plan view, are of stepped or saw-toothed shape and are comprised of successively or subsequently arranged long and short sipe portions. Via this formation or arrangement, the already recited effects that, during traction requirements, grip edges are formed during the opening of the sipes, is particularly readily achieved.

In this connection, it is an additional advantage when the short sipe portions extend at least substantially in the tire circumferential direction and the long sipe portions extend at least substantially in the lateral direction of the pattern. It has been determined that it is particularly favorable, if the short sipe portions have a length between 15 and 40%, particularly about 30%, of the length of the long sipe portions.

In the outer shoulder block row, preferably wave or zig-zag shape sipes are utilized that are comprised by the joining of several ones of wave or zig-zag structures which, when seen by themselves, are at least substantially symmetric. The noted stiffening effects, for obtaining of block rigidity during lateral force loading, are particularly readily achieved via these sipes. In addition, it is further favorable when the wave-shaped or zig-zag formed sipes at least substantially extend in the lateral direction of the tread.

In a preferred embodiment of this invention the tread pattern utilizes three middle block rows between the two shoulder block rows, in which a first middle block row is arranged along the circumferential center line (equator line) of the vehicle tire, wherein this first middle block row and the second middle block row, arranged between the first middle block row and the inner shoulder block row, utilize stepped or saw-toothed shaped sipes, while the third middle block row utilizes wave or zig-zag shaped sipes. It is also important, in the middle or center region of the tread pattern, to assure a good transfer of the driving forces. This is promoted via the arrangement of stepped or saw-tooth shaped sipes.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

Figure 1:
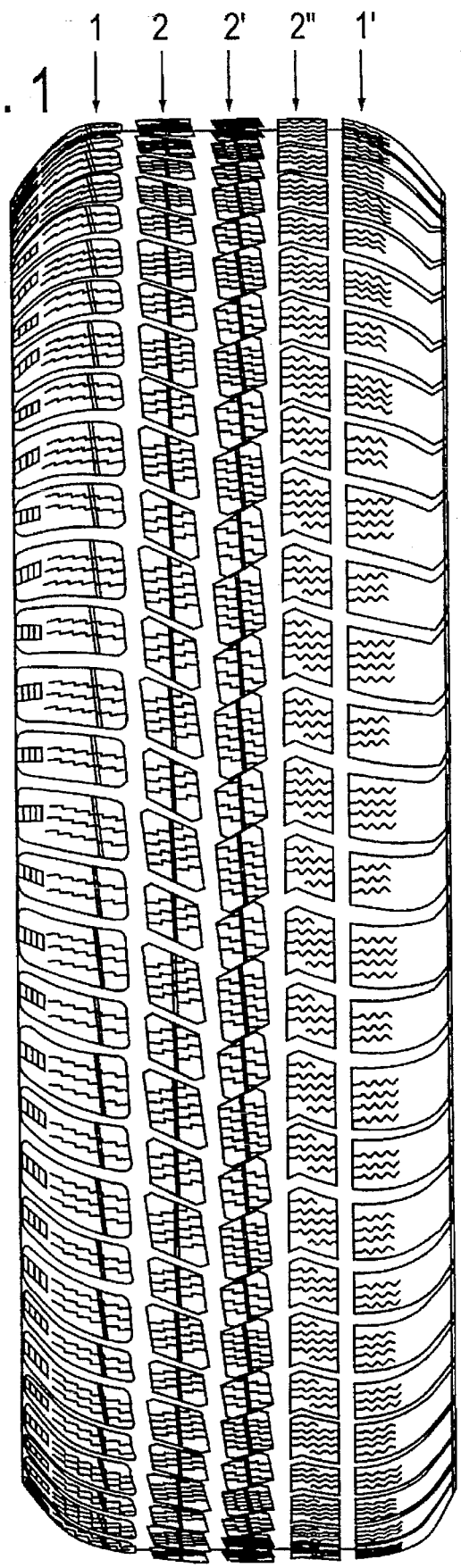
FIG. 1 is a frontal view of a passenger car tire produced in accordance with this invention.

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

As shown in the drawing figures, the illustrated embodiment of the tire has, with reference to the equatorial or circumferential center line M—M of the tire, an asymmetrical tread pattern or profile. The tread pattern is comprised of five rows of tread blocks or elements, namely of two shoulder blocks 1, 1' and three middle rows of blocks 2, 2', 2", the latter blocks being separated from each other by three circumferential grooves 5. It should be noted that shoulder block rows 1, 1' are located partially laterally beyond the ground-contacting regions of the tire, with letter B in FIG. 2 indicating the width of the ground contacting area as per E.T.R.T.O. standards.

The tread blocks or elements of shoulder block row 1 and those of middle block rows 2, 2' are separated, in the circumferential direction, by lateral grooves 3a, 3b and 3c, respectively, with the tread blocks of shoulder block row 1' and those of middle block row 2" being separated by lateral grooves 4b and 4a, respectively.

The tread blocks or elements of block rows 1, 2 and 2' on one side, and the tread blocks of block rows 2" and 1' on the other side, each form similar circumferentially repeating pitches. In the subject embodiment, the separation line L—L extends between each of the one and the other similar pitches within the circumferential groove 5 that separates block row 2' from block row 2". Separation line L—L, with reference to circumferential center line M—M, is offset relative to the outer shoulder, specifically from 5 to 15% of width B. The tire is mounted on the vehicle in a manner such that the portion of the tread profile or pattern, which includes block rows 1, 2, 2', faces the longitudinal axis of the vehicle and is denominated as inner tread portion I, while the tread portion that includes block rows 1', 2" faces toward the outside of the vehicle and is denominated as the outer tread portion A.

In order to avoid dominant frequencies in the emitted or radiated tire/roadway noise and to achieve a spreading of the frequency spectrum, it has been customary to utilize the pitch variation method for tire tread patterns. The term "pitch" refers to a profile or tread structural element which similarly repeats itself in the circumferential direction of the tread, whereby the length thereof, in the circumferential direction of the tire, is referred to as "pitch length". Generally, and as has been customary in this art for some time, the arrangement of the pitches around the circumference of the tire includes variations in pitch length, particularly so that pitches of at least two, and preferably three to five, differing lengths are chosen, whose succession, that is the arrangement around the tire circumference, is obtained and optimized via a suitable computer program.

Figure 2:
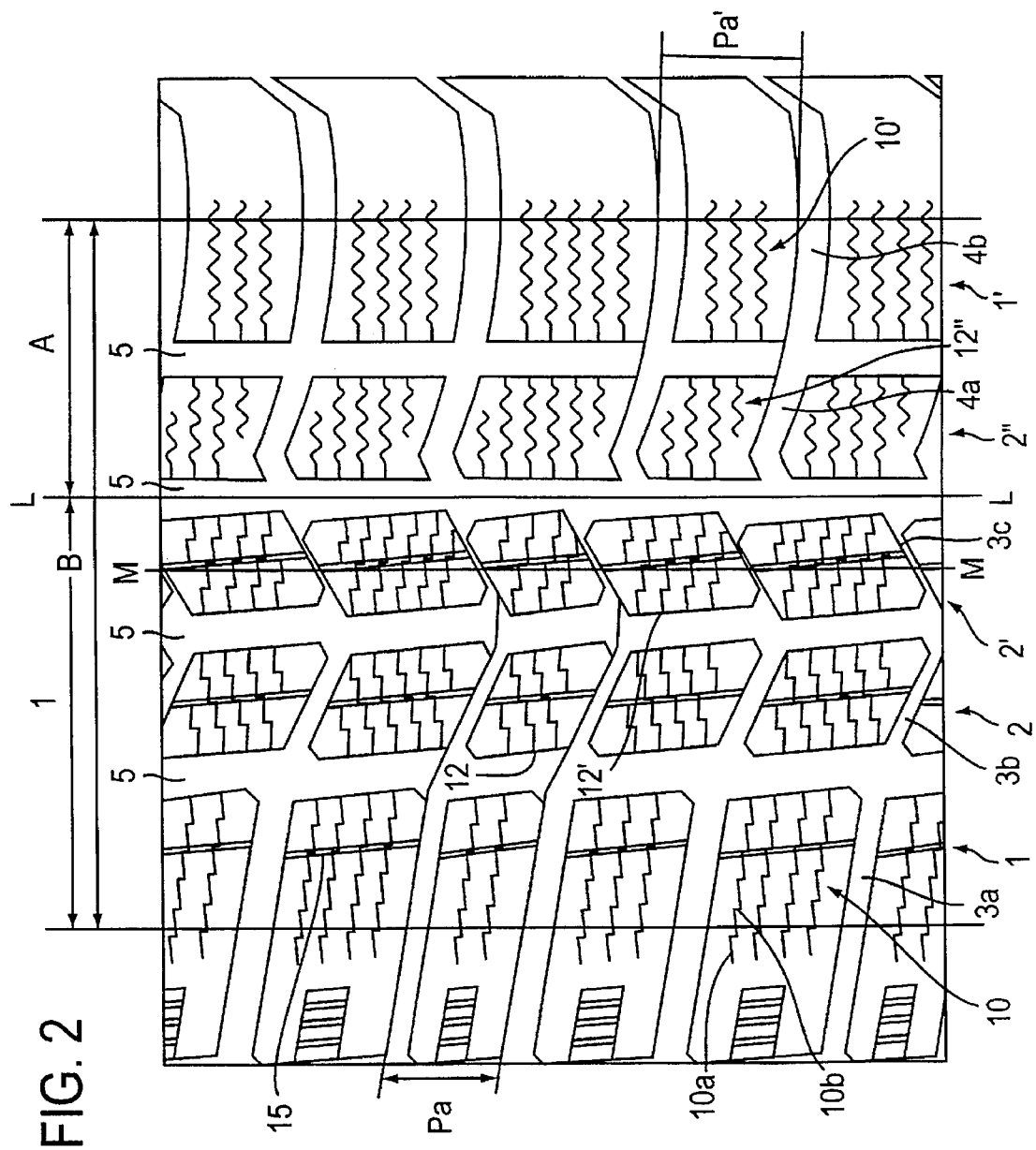
FIG. 2 is a top plan view of a portion of the profile or tread pattern thereof.

In the present embodiment the total number of pitches around the circumference of the tire, in inner tread portion I is 66 and in outer tread portion A is 57. With a total number of pitches, which in passenger car tires is generally between 40 and 80 pitches, the total number of pitches in inner tread portion I of the illustrated tire is chosen to be 15–30% greater than the total number of pitches in outer tread portion A. In addition, in both of inner tread portion I as well as outer tread portion A, each has a chosen pitch sequence having at least two differing pitch lengths. FIG. 2 illustrates, in inner tread portion I, a pitch of length Pa for example, together with the associated pitch boundaries, and also, in outer tread portion A, in the same manner, illustrates a pitch of length P'a. The pitch sequences in portions I and A are not the subject of this invention and are, for example, mathematically or analytically determined and optimized, relative to each other, via one of the methods well known to those skilled in the art.

Each one of the single or individual blocks in block rows 1, 2, 2', 2", 1' is provided with a number of sipes 10, 12 12', 12", 10', respectively. The term "sipe" defines a very small groove or cut having a width of between 0.3 an 0.8 mm, preferably about 0.5 mm. It is customary and part of the state of the art, particularly for tires used in winter driving, to have a plurality of sipes, in order to assure good gripping properties on snow and ice covered surfaces and to provide sufficient traction and braking capacity.

It was determined within the scope of this invention that it is advantageous when, at least in the two shoulder block rows 1, 1', differing types of sipe shapes are utilized. Thus, sipes 10 in the individual blocks of shoulder block row 1, which is contained within inner tread portion I, have a stepped or saw-toothed shape or form, that is, each sipe 10 is comprised of successively or subsequently arranged long and short sipe portions 10a, 10b, respectively, which together make up the stepped or saw-toothed formation. Thereby, the longer sipe portions 10a are those which extend at least substantially in lateral (axial) direction, with the short sipe portions 10b extending in the circumferential or substantially in the circumferential direction. Short sipe portions 10b have a length of between 15 and 40%, preferably about 30%, of the length of the long sipe portions 10a. Each block is provided with at least two sipes 10 which preferably terminate into adjacent circumferential groove 5 and which all together extend substantially in the lateral direction of the tire, the same as the orientation of the individual blocks. The saw-toothed or stepped form has the particular advantage that sipes 10, under traction requirements, open very readily and therefore provide gripping edges. It has surprisingly been determined that the achievement of this effect is preeminently or predominantly obtained in the profile or pattern region of the tire that faces toward or into the vehicle.

On the other hand, sipes 10' which are located in shoulder block row 1' in outer tread portion A are wave or zig-zag shaped and are thus comprised of a succession or sequence of individual, at least substantially symmetric, wave or zig-zag structures or elements. Via the zig-zag or wave form or shape, a reinforcing or bracing effect is achieved, so that, particularly during lateral force loading, high block rigidity is assured, which is of particular importance and significance for the driving behavior, that is handling, above all in curvy situations. Therein, it was determined that this reinforcing effect, above all in outer tread portion A, is of importance.

Middle block row 2, adjacent or adjoining shoulder block row 1' of outer tread portion A, for this reason, is preferably also provided with wave-shaped sipes 12". The orientation or extend of sipes 12" and 10' preferably also extends at least substantially in the lateral direction of the tire and coincides in this embodiment to a great extent with the lateral orientation of the individual blocks of these two rows of blocks.

Stepped or saw-toothed shaped or formed sipes 12, 12' are provided in middle block rows 2, 2' which to a large extent completely traverse the individual blocks and thus terminate on both ends into circumferential grooves 5.

It is an additional advantage, due to noise reasons, that sipes are vented via special small grooves. Such venting grooves 15 are provided in the illustrated embodiment in block rows 1, 2, 2'. Venting grooves 15 are formed as grooves that traverse or cross the blocks substantially in the circumferential direction and have a depth of about 2 mm. Of course it is also possible to also utilize such venting grooves in both additional block rows or to utilize more than one venting groove per block.

In order to have comparable stiffness or rigidity within the entire tire profile or pattern it is additionally advantageous if the spacing or spacings of the adjacent or neighboring sipes in all blocks are chosen as similar as possible or approximately the same.

It was also determined that very calibrated and very good driving behavior properties can be achieved in all disciplines when nearly the same driving area or contact portions or net-to-gross ratios are present in both the left and right tread halves, relative to circumferential center line M—M. This driving area portion (portion of the entire surface of the profile or pattern that comes into actual contact with the ground or road surface) or net-to-gross ratio is advantageously chosen in the region of between 60 and 68%, preferably 65%. The difference in the driving area or contact portion or net-to-gross ratio between the left and right tread halves should not exceed 2%.

In addition, the blocks of middle rows 2, 2' are substantially parallelogram-shaped and thusly arranged that the block edges, relative to circumferential center line M—M, are slightly inclined or slanted, preferably at an angle between 5° and 10° and that the two additional edges extend, relative to circumferential center line M—M, at an angle of between 60° and 80°. The direction of the inclination, particularly for a tread pattern, which is not directionally bound or limited, is, as is the case here, insignificant. The particularly described location of the blocks in middle block rows 2, 2' is favorable for snow traction. An additional advantage of this inclination resides therein that particularly in these block rows via the observance of the described uniform sipe spacing and via the orientation of sipes 12, 12' in opposite angulation to the block edges which bound the lateral grooves 3b, 3c, a larger number of sipes can be accommodated, than in the two shoulder block rows. Thereby, for example, the total number of sipes 12, 12' in middle block rows 2, 2' is at least 20%, preferably up to 50%, greater than the total number of sipes in shoulder block row 1' in outer tread portion A. This measure improves the gripping properties of the tire during winter driving conditions, particularly at starting and during acceleration.

This invention is not limited by the illustrated embodiment. Thus it is particularly possible to so shape the profile or pattern that it is assembled or comprised of pitches that extend over the total width of the pattern. In place of the block rows, particularly in the center region of the tread, additional tread bands can be arranged which, for example, are provided with pocket or land-locked grooves or at least are provided with substantially continuous tread bands having suitable numbers and formations of sipes.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A motor vehicle tire having a tread comprising:
an asymmetrically shaped tread pattern, including an inner tread portion and an outer tread portion;
a plurality of circumferentially extending rows of tread pattern structures, said rows of tread pattern structures including a circumferentially extending inner shoulder block row in said inner tread portion and a circumferentially extending outer shoulder block row in said outer tread portion;
said inner shoulder block row comprising a plurality of inner shoulder blocks having only sipes with a stepped shape for facilitating opening of the inner shoulder block sipes in a circumferential direction; and
said outer shoulder block row comprising a plurality of outer shoulder blocks having only sipes with one of a wave and a zig-zag shape for providing the blocks of the outer shoulder block row with high rigidity during lateral force loading;
wherein said stepped shape has a different shape than said one of said wave and zig-zap shape.

2. A motor vehicle tire according to claim 1, wherein:
said stepped shape of said sipes in said inner shoulder block row are comprised of successively arranged long sipe portions and short sipe portions.

3. A motor vehicle tire according to claim 2, wherein:
said short sipe portions extend at least substantially circumferentially; and
said long sipe portions extend at least substantially laterally.

4. A motor vehicle tire according to claim 3, wherein:
said plurality of circumferentially extending rows of tread pattern structures further include three middle block rows extending circumferentially between said inner and outer shoulder block rows;
a first row of said middle block rows being arranged along a circumferential center line of the vehicle tire;
a second row of said middle block rows is positioned between said first middle block row and said inner shoulder block row, said first and second middle block rows include sipes having a stepped shape; and
a third row of said middle block rows includes sipes having one of a wave and zig-zag shape.

5. A motor vehicle tire according to claim 2, wherein:
said short sipe portions have a length of between 15% and 40% of said long sipe portions.

6. A motor vehicle tire according to claim 5, wherein:
said short sipe portions have a length of about 30% of said long sipe portions.

7. A motor vehicle tire according to claim 2, wherein:
said plurality of circumferentially extending rows of tread pattern structures further include three middle block rows extending circumferentially between said inner and outer shoulder block rows;
a first row of said middle block rows being arranged along a circumferential center line of the vehicle tire;
a second row of said middle block rows is positioned between said first middle block row and said inner shoulder block row, said first and second middle block rows include sipes having a stepped shape; and
a third row of said middle block rows includes sipes having one of a wave and zig-zag shape.

8. A motor vehicle tire according to claim 1, wherein:
each said one of said wave and said zig-zag shape of said sipes in said outer shoulder block row is substantially symmetric.

9. A motor vehicle tire according to claim 8, wherein:
said one of said wave and said zig-zag shape of said sipes in said outer shoulder block row extend at least substantially laterally.

10. A motor vehicle tire according to claim 9, wherein:
said plurality of circumferentially extending rows of tread pattern structures further includes three middle block rows extending circumferentially between said inner and outer shoulder block rows;

a first row of said middle block rows being arranged along a circumferential center line of the vehicle tire;

a second row of said middle block rows is positioned between said first middle block row and said inner shoulder block row, said first and second middle block rows include sipes having a stepped shape; and a third row of said middle block rows includes sipes having one of a wave and zig-zag shape.

11. A motor vehicle tire according to claim 8, wherein:

said plurality of circumferentially extending rows of tread pattern structures further include three middle block rows extending circumferentially between said inner and outer shoulder block rows;

a first row of said middle block rows being arranged along a circumferential center line of the vehicle tire;

a second row of said middle block rows is positioned between said first middle block row and said inner shoulder block row, said first and second middle block rows include sipes having a stepped shape; and a third row of said middle block rows includes sipes having one of a wave and a zig-zag shape.

12. A motor vehicle tire according to claim 1, wherein:

said plurality of circumferentially extending rows of tread pattern structures further include three middle block rows extending circumferentially between said inner and outer shoulder block rows;

a first row of said middle block rows being arranged along a circumferential center line of the vehicle tire;

a second row of said middle block rows is positioned between said first middle block row and said inner shoulder block row, said first and second middle block rows include sipes having a stepped shape; and a third row of said middle block rows includes sipes having one of a wave and a zig-zag shape.

13. A motor vehicle tire having a tread comprising:

an asymmetrically shaped tread pattern, including an inner tread portion and an outer tread portion;

a plurality of circumferentially extending rows of tread pattern structures, said rows of tread pattern structures including a circumferentially extending inner shoulder block row in said inner tread portion and a circumferentially extending outer shoulder block row in said outer tread portion;

said inner shoulder block row comprising a plurality of inner shoulder blocks including only sipes having a stepped shape, which comprises successively arranged long sipe portions and short sipe portions for facilitating opening of the inner shoulder block sipes in a circumferential direction; and said outer shoulder block row comprising a plurality of outer shoulder blocks including only sipes having a substantially symmetric wave shape for providing the blocks of the outer shoulder block row with high rigidity during lateral force loading, wherein said stepped shape has a different shape than said wave shape.

14. A motor vehicle tire according to claim 13, wherein:

said short sipe portions extend at least substantially circumferentially; and said long sipe portions extend at least substantially laterally.

15. A motor vehicle tire according to claim 13, wherein:

said short sipe portions have a length of between 15% and 40% of said long sipe portions.

16. A motor vehicle tire according to claim 15, wherein:

said short sipe portions have a length of about 30% of said long sipe portions.

17. A motor vehicle tire according to claim 13, wherein:

said wave shape of said sipes in said outer shoulder block row extend at least substantially laterally.

* * * * *